US006762844B2

(12) United States Patent
Dress et al.

(10) Patent No.: US 6,762,844 B2
(45) Date of Patent: Jul. 13, 2004

(54) OPTICAL MICROSCOPE USING AN INTERFEROMETRIC SOURCE OF TWO-COLOR, TWO-BEAM ENTANGLED PHOTONS

(75) Inventors: William B. Dress, Knoxville, TN (US); Roger A. Kisner, Knoxville, TN (US); Roger K. Richards, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 240 days.

(21) Appl. No.: 09/938,843

(22) Filed: Aug. 24, 2001

(65) Prior Publication Data

US 2003/0098979 A1 May 29, 2003

(51) Int. Cl.[7] .............................................. G01B 9/02
(52) U.S. Cl. ........................................................ 356/484
(58) Field of Search ................................. 356/484, 450, 356/496

(56) References Cited

U.S. PATENT DOCUMENTS 5,796,477 A * 8/1998 Teich et al. ................. 356/450

OTHER PUBLICATIONS

Boto et al., "Quantum interferometric optical lithography: exploiting entanglement to beat the diffraction limit," *Phys. Rev. Lett.*, 85(13):2733–2736, 2000.
Bouwmeester et al., "Experimental quantum teleportation," *Nature*, 390:575–579, 1997.
Rarity and Tapster, "Experimental violation of Bell's inequality based on phase and momentum," *Phys. Rev. Lett.*, 64(21):2495–2498, 1990.
Rarity and Tapster, "Two–color photons and nonlocality in fourth–order interference," *Phys. Rev. A.*, 41(9):5139–5146, 1990.
Rarity et al., "Two–photon interference in a Mach–Zehnder Interferometer," *Phys. Rev. Lett.*, 65(11):1348–1351, 1990.
International Search Report for PCT/US02/26832, Mar. 21, 2003.
International Search Report for PCT/US02/26833, Mar. 21, 2003.
Larchuck, et al. "Interfering entangled photons of different colors" Physical Review Letters, vol. 70, No. 11, pp. 1603–1606, Mar. 15, 1993.

(List continued on next page.)

*Primary Examiner*—Samuel A. Turner
(74) *Attorney, Agent, or Firm*—Gray Cary Ware & Freidenrich, LLP

(57) ABSTRACT

Systems and methods are described for an optical microscope using an interferometric source of multi-color, multi-beam entangled photons. A method includes: downconverting a beam of coherent energy to provide a beam of multi-color entangled photons; converging two spatially resolved portions of the beam of multi-color entangled photons into a converged multi-color entangled photon beam; transforming at least a portion of the converged multi-color entangled photon beam by interaction with a sample to generate an entangled photon specimen beam; and combining the entangled photon specimen beam with an entangled photon reference beam within a single beamsplitter. An apparatus includes: a multi-refringent device providing a beam of multi-color entangled photons; a condenser device optically coupled to the multi-refringent device, the condenser device converging two spatially resolved portions of the beam of multi-color entangled photons into a converged multi-color entangled photon beam; a beam probe director and specimen assembly optically coupled to the condenser device; and a beam splitter optically coupled to the beam probe director and specimen assembly, the beam splitter combining an entangled photon specimen beam from the beam probe director and specimen assembly with an entangled photon reference beam.

19 Claims, 4 Drawing Sheets

OTHER PUBLICATIONS

Shimizu, et al. "Quantum communication with a 2-bit message coding for each transmitted photon" Technical Digest, the Pacific Rim Conference on Lasers and Electro–Optics, pp. 790–780, Jul. 16, 1997.

Yoon–Ho, et al. "Bell–stated preparation using pulsed non-degrenerate two–photon entanglement", Physical review, vol. 63, No. 6, pp. 060301/1–4, Jun. 2001.

* cited by examiner

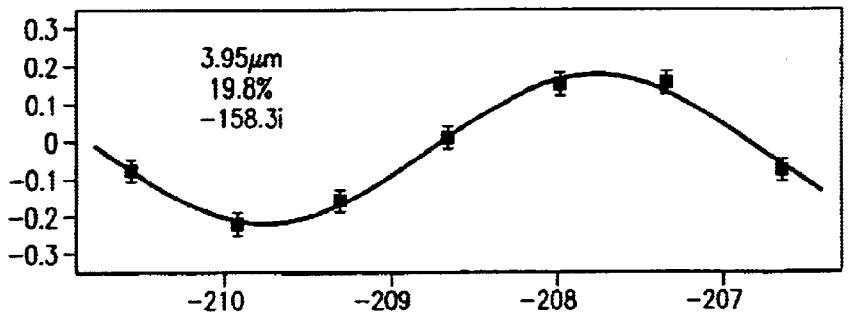
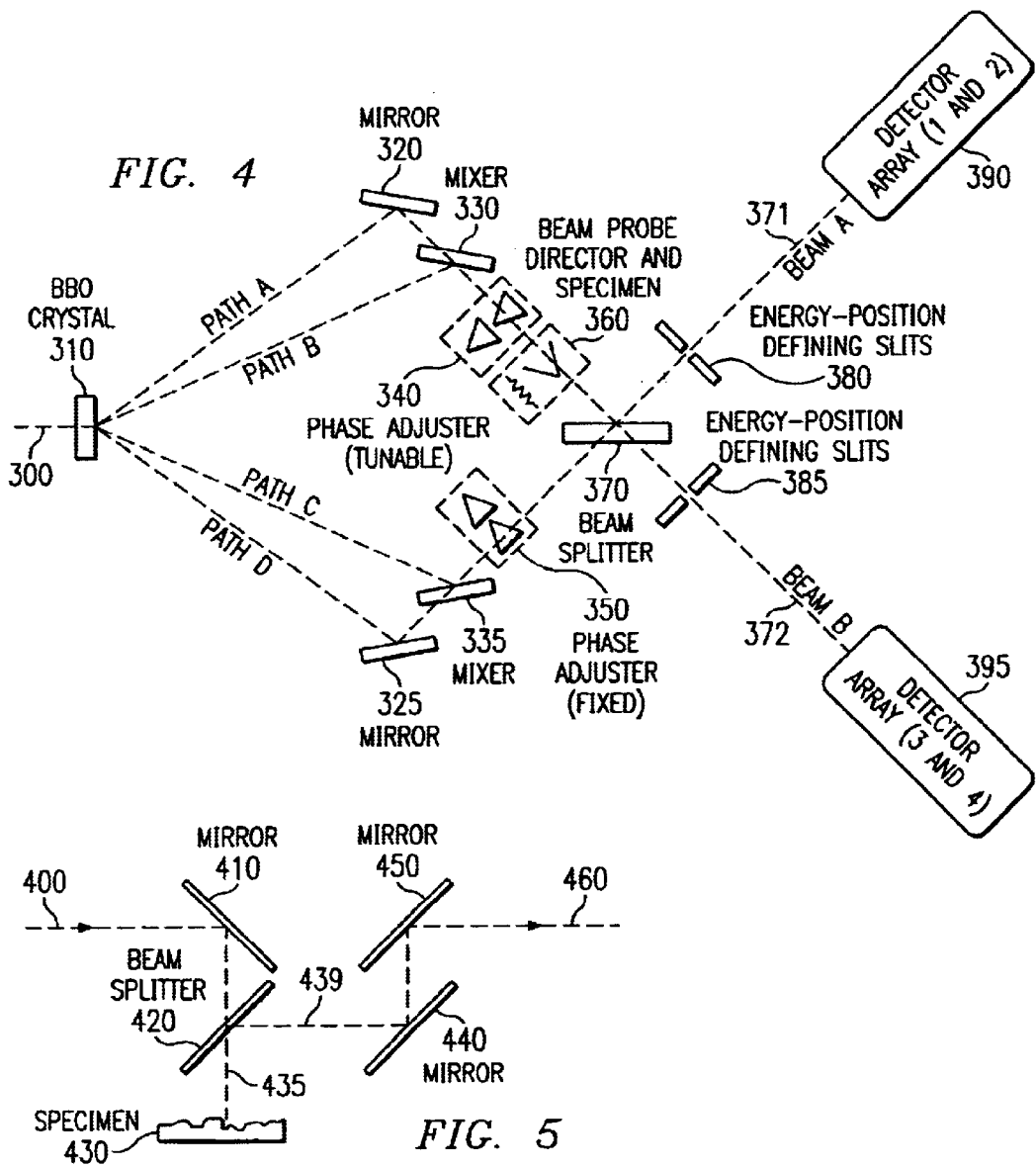

OPTICAL MICROSCOPE USING AN INTERFEROMETRIC SOURCE OF TWO-COLOR, TWO-BEAM ENTANGLED PHOTONS

STATEMENT AS TO RIGHTS TO INVENTIONS MADE UNDER FEDERALLY-SPONSORED RESEARCH AND DEVELOPMENT

This invention was made with United States Government support under contract to DE-AC05-00OR22725 to UT-Battelle, LLC. awarded by the Department of Energy. The Government has certain rights in this invention.

BACKGROUND OF THE INVENTION

1. Field of the Invention

The invention relates generally to the field of interferometry. More particularly, the invention relates to an interferometric source of multi-color, multi-beam entangled photons.

2. Discussion of the Related Art

Quantum mechanical entanglement holds the promise of fundamental advances in sensing, metrology, computing, and communications. Polarization experiments at numerous laboratories [D. Bouwmeester et al., "Experimental Quantum Teleportation," *Nature* 390, 575 (1997)] demonstrate the capability of generating entangled photons and entangled interferometry over long distances. Their results indicate violations of Bell's inequalities, showing that the observed interference is quantum rather than classical. However, the nature of polarization entanglement does not easily lend itself to remote sensing, communications, or microscopy.

Rarity and Tapster, [Rarity and Tapster, "Experimental violation of Bell's inequality based on phase and momentum," *Phys. Rev. Lett.*, 64:2495, 1990.] constructed a coincidence-based measurement system that showed two-color fourth-order interference. The Rarity and Tapster system used two separate beam splitters with four emergent beams. The Rarity and Tapster system reduced a degree of uncertainty (it erased momentum information) and produced a fourth-order (temporal) interference. What is needed is an approach that removes further degrees of uncertainty from multi-color photons. What is also needed is an approach that can produce an Nth-order interference (where $N \geq 4$) with fewer than four emergent beams.

A shortcoming of the Rarity and Tapster system is that interferometric measurement devices that utilize this system can not operate with consistent accuracy over a wide range of displacement. Measurements taken by such devices would include errors caused by fringes on interference patterns they produced. Therefore, what is also needed is an approach that permits interferometric displacement measurements over a wide range of displacements with consistent accuracy.

Heretofore, the requirements of removing further degrees of uncertainty from multi-color photons, producing an Nth-order interference pattern (where $N \geq 4$) with fewer than four emergent beams and performing interferometric displacement measurements over a wide range of displacement with consistent accuracy have not been fully met. What is needed is a solution that addresses these requirements.

SUMMARY OF THE INVENTION

There is a need for the following embodiments. Of course, the invention is not limited to these embodiments.

According to an aspect of the invention, a method comprises: downconverting a beam of coherent energy to provide a beam of multi-color entangled photons; converging two spatially resolved portions of the beam of multi-color entangled photons into a converged multi-color entangled photon beam; transforming at least a portion of the converged multi-color entangled photon beam by interaction with a sample to generate an entangle photon specimen beam; and combining the entangled photon specimen beam with an entangled photon reference beam within a single beamsplitter. According to another aspect of the invention, an apparatus comprises: a multi-refringent device providing a beam of multi-color entangled photons; a condenser device optically coupled to the multi-refringent device, the condenser device converging two spatially resolved portions of the beam of multi-color entangled photons into a converged multi-color entangled photon beam; a beam probe director and specimen assembly optically coupled to the condenser device; and a beam splitter optically coupled to the beam probe director and specimen assembly, the beam splitter combining an entangled photon specimen beam from the beam probe director and specimen assembly with an entangled photon reference beam According to another aspect of the invention, a method comprises: downconverting a beam of coherent energy to provide a beam of multi-color entangled photons; converging two spatially resolved portions of the beam of multi-color entangled photons into a converged multi-color entangled photon beam; changing a phase of at least a portion of the converged multi-color entangled photon beam to generate a first interferometeric multi-color entangled photon beam; and combining the first interferometric multi-color entangled photon beam with a second interferometric multi-color entangled photon beam within a single beamsplitter. According to another aspect of the invention, an apparatus comprises: a multi-refringent device optically coupled to a source of coherent energy, the multi-refringent device providing a beam of multi-color entangled photons; a condenser device optically coupled to the multi-refringent device, the condenser device converging two spatially resolved portions of the beam of multi-color entangled photons into a converged multi-color entangled photon beam; a tunable phase adjuster optically coupled to the condenser device, the tunable phase adjuster changing a phase of at least a portion of the converged multi-color entangled photon beam to generate a first interferometeric multi-color entangled photon beam; and a beam splitter optically coupled to the condenser device, the beam splitter combining the first interferometeric multi-color entangled photon beam with a second interferometric multi-color entangled photon beam.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings. The invention may be better understood by reference to one or more of these drawings in combination with the description presented herein. It should be noted that the features illustrated in the drawings are not necessarily drawn to scale.

FIGS. 3A–3C illustrate data generated by an interferometer configuration and collected by a detection system, representing an embodiment of the invention.

FIG. 4 illustrates a schematic view of an interferometer configuration with a specimen stage, representing an embodiment of the invention.

FIG. 5 illustrates a block schematic view of a probe beam director with specimen, representing an embodiment of the invention.

DESCRIPTION OF PREFERRED EMBODIMENTS

Figure 1:
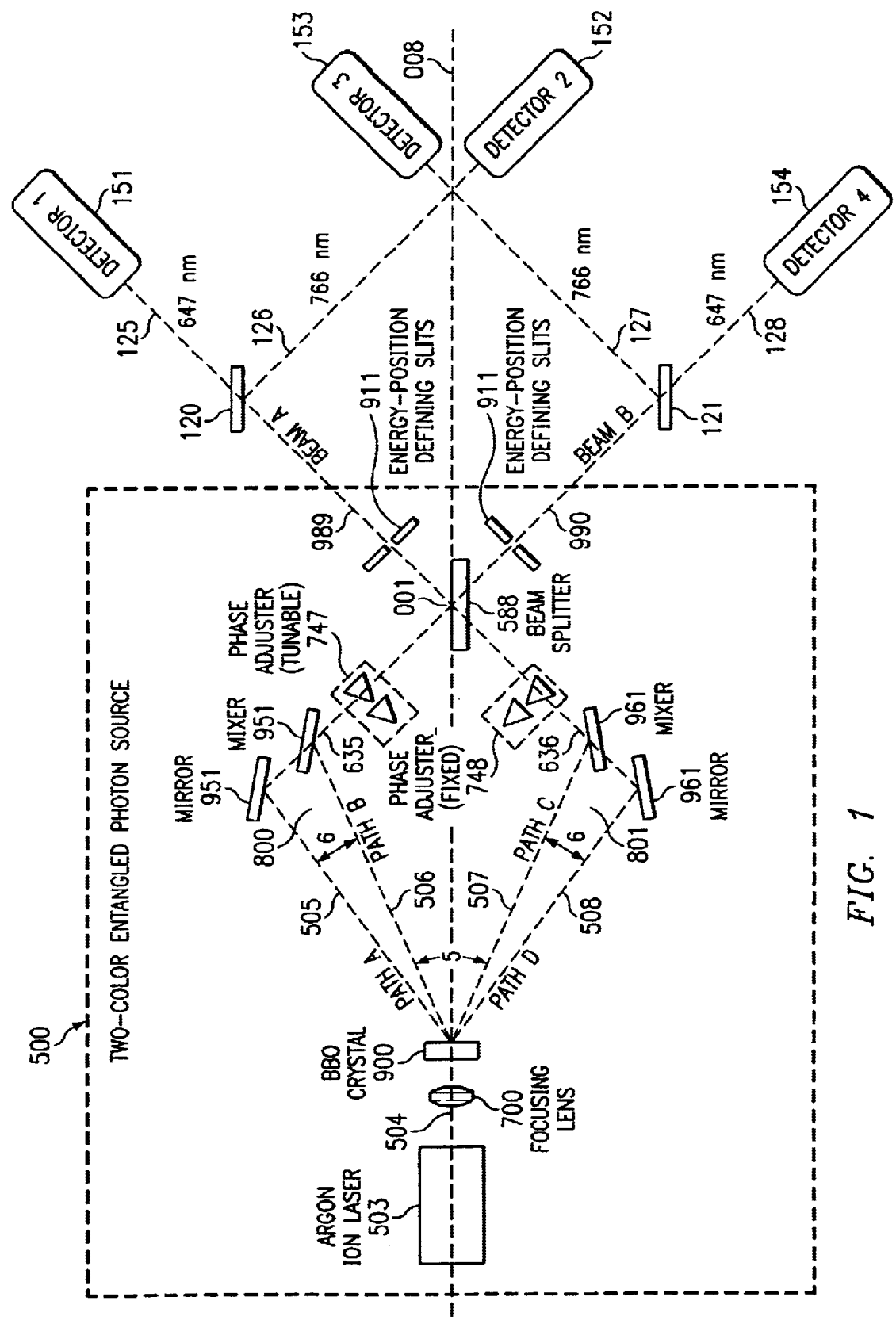
FIG. 1 illustrates a block schematic view of an interferometer configuration, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements that can be made within the spirit and/or scope of the underlying inventive concept will become apparent to those skilled in the art from this detailed description.

Within this application several publications are referenced. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art. The disclosure of this application is similar to U.S. Ser. No. 09/939,303, filed Aug. 24, 2001, now pending, the entire contents of which are hereby expressly incorporated by reference herein for all purposes.

Brief Theory

The physical "entanglement" of two quantum entities simply means that knowledge of the properties of one entity entails knowledge about the properties of the other. The mathematical description of entanglement is that of inseparability. That is, a state of two entangled particles cannot be separated into a single product of two distinct states but must be represented as a sum of products. A simple example from function theory on product spaces illustrates this point.

Consider two function spaces labeled $\mathcal{H}_1$ and $\mathcal{H}_2$, each space may represent a single particle, and the number of states allowed for each particle is the dimension of that space. To be able to distinguish maximal entanglement from particle entanglement, the spaces must have dimensions greater than two, where all functions are either unentangled or maximally entangled. Suppose $\{\phi_1, \phi_2, \phi_3\}$ is a basis for $\mathcal{H}_1$ and $\{\chi_1, \chi_2, \chi_3\}$ is a basis for $\mathcal{H}_2$. Using lower-case Greek characters to denote functions and lower-case Roman characters to denote complex numbers, the function space $\mathcal{H} = \mathcal{H}_1 \otimes \mathcal{H}_2$ can be described by forming the basis $\{\phi_j \chi_1\} j=1,3, j=1,3$. An arbitrary product function is written as $$\omega = \alpha_{1,1}\phi_1\chi_1 + \alpha_{2,1}\phi_2\chi_1 + \alpha_{3,1}\phi_3\chi_1 + \alpha_{1,2}\phi_1\chi_2 + \alpha_{2,2}\phi_2\omega_2 + \alpha_{3,2}\phi_3\chi_3 + \alpha_{2,3}\phi_2\chi_3 + \alpha_{3,3}\phi_3\chi_3, \quad (1)$$

which may be written $$\omega = (\alpha_{1,1}\phi_1 + \alpha_{2,1}\phi_2 + \alpha_{3,1}\phi_3)\chi_1 + (\alpha_{1,2}\phi_1 + \alpha_{2,2}\phi_2 + \alpha_{3,2}\phi_3)\chi_2 + (\alpha_{1,3}\phi_1 + \alpha_{2,3}\phi_2 + \alpha_{3,3}\phi_3)\chi_3. \quad (2)$$

Letting $\zeta_4 = \alpha_{1,4}\phi_1 + \alpha_{2,4}\phi_2 + \alpha_{3,4}\phi_3$, which are functions belonging to $\mathcal{H}_1$, Eq. 2 becomes $\omega = \zeta_1\chi_1 + \zeta_2\chi_2 + \zeta_3\chi_3$. That is, a function on the two three-dimensional spaces can be represented as the sum of products, one factor from each space. In general, this expression cannot be factored further to reduce the number of terms; this function is termed "inseparable" or "entangled." However, for a particular choice of expansion coefficients, the function $\omega$ may be written as a simple product of a single function belonging to $\mathcal{H}_1$ in the fashion $\omega = \zeta(\chi_1 + \chi_2 + \chi_3)$ where $\zeta = b_1\phi_1 + b_2\phi_2 + b_3\phi_3 \in H_1$ and $\chi_1 + \chi_2 + \chi_3 \in H_2$. (A set of coefficients producing this function is $\alpha_{i,b} = b_n$ for i,k=1,2,3.) Such a function is termed "separable" and is unentangled as it can be written as a single-term product of two functions, one from each space. For a different choice of coefficients, one may write $\omega = \zeta_1\eta_1 + \zeta_2\eta_2$, where $\zeta \in H_1$ and $\eta_f \in H_2$. A set of coefficients producing this example may be as simple as $\alpha_{1,1} = \alpha_{3,3} = 1$ with all other coefficients equal to zero. This function is partially entangled, as it requires two terms in its most compact (factored) form. In general, if a function requires only one term, it is unentangled; if it requires $\eta$ terms where each of the spaces have $\eta$ dimensions, then the function is maximally entangled. Any number of terms less than $\eta$ but greater than one represent partially separable or partially entangled functions. For the unique case of two dimensions, the function takes on the form $$\omega = a\phi_1\chi_2 + b\phi_2\chi_1, \quad (3)$$

when $\alpha_{1,1} = \alpha_{2,2} = 0$. This expression is not factorable; the function $\omega$ is inseparable or entangled; indeed it is maximally entangled and represents the biphoton of central interest in this invention. It can be demonstrated that an entangled wave function leads to the existence of a joint probability distribution when the corresponding quantum-mechanical operators commute. This joint distribution has the startling property that, from a measurement on one of the particles, one can predict with certainty the probability distribution of the other particle. If the distributions are singular and have only one outcome, then a particular property can be predicted with certainty. Since conservation laws are assumed to apply to individual events as well as ensembles of events, the predictions hold statistically valid for individual events as well as for large numbers of events. Note that the two extremes of a completely entangled function and a completely separable function are both unique cases, the generic case is that of a partially entangled function. Thus, it is important to achieve either extreme situation. Partial entanglement would seem to be the rule for multi-particle quantum systems that spring from a well-defined, pure state.

Overview

The invention can include the generation of a plurality of N-way entangled photon beams (where $N \geq 2$). These beams can be characterized by unique wave functions. The invention can include generating this plurality of N-way entangled photon beams with a downconversion and entanglement device such as, for example, a multi-refringent crystal. For instance, a bi-refringent crystal can be used to generate two-way entangled photon beams. The state of a first N-way entangled photon beam output may be described by a function of N component photon beams generated by coherent light transmitted through a bi-refringent crystal, and the state of the second N-way entangled photon beam output may be described as the double of the first N-way entangled photon beam output, and hence also as a function of N component photon beams generated by coherent light transmitted through the bi-refringent crystal.

The invention can include an interferometer that produces two output beams of entangled wavefunctions (e.g., photons). Each of the wavefunctions can be described by distinct momentum and energy characteristics. The interferometer selects two wavelengths from a downconverted spectrum of a bi-refringent crystal, which is pumped by a shorter wavelength coherent beam (from a laser). The invention permits the generation of two output beams with entangled wavefunctions uniquely distributed on each beam. The invention permits both momentum and energy erasure. Momentum and energy-dependent information in the two output optical paths can be erased by convergence of the individual internal optical paths. A beamsplitter performs the final convergence and interference of these paths. The length (and hence phase) of internal optical paths in the interferometer can be adjusted to alter the probability of entangled wavefunctions exiting together (on one or the other of the two output beams) or exiting separately on each beam. This interferometer can exhibit fourth-order interference using the entangled photons. The interferometer generates uniquely entangled photons that can be used in a variety of scientific experiments and in practical industrial apparatus. The interferometer may be used in several useful applications with the phase set for the output wavefunction to be present, in some predetermined proportion, on both output beams. The interferometer can be combined with a light source and a detector system.

The invention can include providing a capability to adjust the relative beam path phase so a photon pair can be forced either into each output beam together (with a 50—50 probability of being in either output beam) or into each output beam simultaneously (where the biphoton or wavefunction is present in both beams simultaneously).

The invention can include the use of a variety of coherent light sources to excite the down-conversion crystal. More generally, the invention can include a wave function generator. The wave function generator can include a source of substantially monochromatic energy. The wave function generator is preferably a source of coherent energy such as a laser and/or a maser. For instance, the invention can include the use of an argon ion laser (e.g., operated in continuous wave mode). The source of coherent light used to excite the downconversion crystal can have different wavelengths. Of course, the wavelengths can be different than what the inventors chose for the initial studies. Further, a different types of laser can be employed such as, for example, a solid-state laser. The invention can include a plurality of wave function generators.

The invention can include a downconversion and entanglement device. For instance, the downconversion and entanglement device can be a beta-barium borate (BBO) crystal. However, the downconverter can be made of a different material or construction. Other arrayed substances can be used including nano-structured devices. Non crystalline substances may also be used. In the case of BBO, wavelengths of 766.5 nm and 647.9 nm can be chosen as a function of the wavelength of the wave function generator to permit differential quantum absorption in a potassium vapor cell. Clearly other complimentary wavelength pairs may be chosen for a particular application.

The downconversion and entanglement device can include a multi-refringent device. The multi-refringent device can assume various forms. The multi-refringent device can include one or more non-linear crystals. The non-linear crystal(s) can include one or more non-linear optical crystal(s). The non-linear optical crystal(s) can include one or more uni-axial crystal(s) (bi-refringent), one or more bi-axial crystal(s) (tri-refringent) and/or one or more tri-axial crystal(s), etceteras. The non-linear optical crystal can include one or more inorganic non-linear optical crystal(s) and/or one or more organic non-linear optical crystal(s). The invention can include a plurality of multi-refringent devices.

For instance, the non-linear crystal can include a basic non-linear optical crystal such as: $LiB_3O_5$ (Lithium Triborate, LBO), $KH_2PO_4$ (Potassium Dihydrogen Phosphate, KDP), $KD_2PO_4$ (Deuterated Potassium Dihydrogen phosphate, DKDP), $NH_4H_2PO_4$ (Ammonium Dihydrogen Phosphate, ADP), $\beta$-$BaB_2O_4$ (Beta-Barium Borate, BBO), $LiIO_3$ (Lithium Iodate), $KTiOPO_4$ (Potassium Titanyl Phosphate, KTP), $LiNbO_3$ (Lithium Niobate), $KnbO_3$ (Potassium Niobate), $AgGaS_2$ (Silver Thiogallate), and $ZnGeP_2$ (Zinc Germanium Phosphide).

Further, the non-linear crystal can include one of the frequently used non-linear optical crystals such as: $KB_5O_8$-$4H_2O$ (Potassium Pentaborate Tetrahydrate, KB5), $CO(NH_2)_2$ (Urea), $CsH_2AsO_4$ (Cesium Dihydrogen Arsenate, KTA), $CsD_2AsO_4$ (Deuterated Cesium Dihydrogen Arsenate, DCDA), $KTiOAsO_4$ (Potassium Titanyl Arsenate, KTA), MgO: $LiNbO_3$ (Magnesium-Oxide-Doped Lithium Niobate), $Ag_3AsS_3$ (Proustite), GaSe (Gallium Selenide), $AgGaSe_2$ (Silver Gallium Selenide), CdSe (Cadmium Selenide), and $CdGeAs_2$ (Cadmium Germanium Arsenide).

Furthermore, the non-linear crystal can include other inorganic non-linear optical crystals such as: $KB_5O_8$-$4D_2O$ (Deuterated Potassium Pentaborate Tetrahydrate, DKB5), $CsB_3O_5$ (Cesium Triborate, CBO), $BeSO_4$-$4D_2O$ (Beryllium Sulfate), $MgBaF_4$ (Magnesium Barium Fluoride), $NH_4D_2PO_4$ (Deuterated Ammonium Dihydrogen Phosphate, DADP), $RbH_2Po_4$ (Rubidium Dihydrogen Phosphate, RDP), $RbD_2PO_4$ (Deuterated Rubidium Dihydrogen Phosphate, DRDP), $KH_2AsO_4$ (Deuterated Potassium Dihydrogen Arsenate, DKDA), $NH_4H_2AsO_4$ (Ammonium Dihydrogen Arsenate, ADA), $NH_4D_2AsO_4$ (Deuterated Ammonium Dihydrogen Arsenate, DADA), $RbH_2AsO_4$ (Rubidium Dihydrogen Arsenate, RDA), $RbD_2AsO_4$ (Deuterated Rubidium Dihydrogen Arsenate, DRDA), LiCOOH—H$_2$O (Lithium Formate Monohydrate, LFM), NaCOOH (Sodium Formate), Ba(COOH)$_2$ (Barium Formate), Sr(COOH)$_2$ (Strontium Formate), Sr(COOH)$_2$.2H$_2$O (Strontium Formate Dihydrate), LiGaO$_2$ (Lithium Gallium Oxide), α-HIO$_3$ (α-Iodic Acid), K$_2$La(NO$_3$)$_5$.2H$_2$O (Potassium Lanthanum Nitrate Dihydrate, KLN), CsTiOAsO$_4$ (Cesium, Titanyl Arsenate, CTA), NaNO$_2$ (Sodium Nitrate), Ba$_2$NaNb$_5$O$_{15}$ (Barium Sodium Niobate, "Banana"), K$_2$Ce(NO$_3$)$_5$.2H$_2$O (Potassium Cerium Nitrate Dihydrate, KCN), K$_3$Li$_2$Nb$_5$O$_{15}$ (Potassium Lithium Niobate), HgGa$_2$S$_4$ (Mercury Thiogallate), HgS (Cinnibar), Ag$_3$SbS$_3$ (Pyrargyrite), Se (Selenium), Tl$_3$AsS$_3$ (Thallium Arsenic Selenide, TAS), and Te (Tellurium).

Furtherstill, the non-linear crystal can include an organic non-linear optical crystal such as: C$_{12}$H$_{22}$O$_{11}$ (Sucrose, Saccharose), L-Arginine Phosphate Monohydrate (LAP), Deuterated L-Arginine Phosphate Monohydrate (DLAP), L-Pyrrolidone-2-Carboxylic Acid (L-PCA), CaC$_4$H$_4$O$_6$.4H$_2$O (Calcium Tartrate Tetrahydrate, L-CTT), (NH$_4$)$_2$C$_2$O$_4$.H$_2$O (Ammonium Oxalate, AO), m-Bis(amonimethyl)benzene (BAMB), 3-Methoxy-4hydroxy-benzaldehyde (MHBA), 2-Furyl Methacrylic Anhydride (FMA), 3-Methyl-4-nitropyridine-1-oxide (POM), Thienyl-chalcone (T-17), 5-Nitrouracil (5NU), 2-(N-Prolinol-5-nitropyridine (PNP), 2-Cyclooctylamino-5-nitropyridine (COANP), L-N-(5-Nitro-2-pyridyl)leucinol (NPLO), C$_6$H$_4$(NO$_2$)$_2$ (m-Dinitrobenzene, MDNB), 4-(N,N-Dimethylamino)-3-acetaminonitrobenzene (DAN), Methyl-(2,4-dinitrophenyl)-aminopropanoate (MAP), m-Nitroaniline (MNA), N-(4-Nitrophenyl-N-methylaminoacetonitrile (NPAN), N-(4-Nitrophenyl)-L-prolinol (NPP), 3-Methyl-4-methoxy-4-nitrostilbene (MMONS), and α-SiO$_2$ (Crystalline Quartz). Of course, the invention can utilize other non-linear optical crystals that are not explicitly recited herein.

The invention can include merging all paths of a biphoton from the downconversion and entanglement device into a beam splitter (aka beam combiner) that can be used to produce two output beams. This merging can provide fourth-order interference. This merging can also provide other classes of interference related to non-local interaction. This merging can also erase momentum and energy information in the paths.

The invention can include a condenser device. The condenser device can take various forms. The condenser device can include wavelength selective mirrors and/or wavelength selective filters. The color pairs obtained from the quasi-beams can be varied by moving the wavelength selective mirrors and/or wavelength selective filters. The invention can include a plurality of condenser devices.

The invention can include a beam splitter device. The beam splitter device can assume various forms. The beam splitter is preferably a bi-directional device that performs a beam combining function, as well as the beam splitting function. The invention can include a plurality of beam splitter. A variety of materials and coatings can be used for the mirrors, mixers, and beamsplitters.

The invention can include introducing and/or controlling phase delay in one, or more of the beams. One approach is to change the path length of one, or more of the beams. Other approaches to introducing and controlling phase delay are possible including glass plates, optical fibers, and reflectors.

The invention can include cold filters and/or cold mirrors to separate component wavelengths. Other separators can be used including spectrometers and wavelength selective detectors.

The invention can include the use of photomultiplier tubes to detect photons. Of course, other photon detectors may be used including solid-state types.

The invention can include the use of particles instead of photons. For instance, the invention can include an interferometer built to produce entangled beams of particles such as neutrons.

Exemplary Systems

The source of uniquely entangled photons is a nested three-interferometer system in which two Mach-Zehnder interferometers form the legs of a third Mach-Zehnder interferometer. The interferometer configuration is diagramed in FIG. 1 below. A discussion of the components follows:

Shown in FIG. 1 is a two-color entangled photon source 503. A source of short-wavelength, coherent light 503, such as an argon ion laser, directs a light beam 504 towards a focusing lens 700. The focusing lens 700 focuses the light beam 504 on a bi-refringent crystal 900. A beta-barium borate (BBO) crystal is shown in this example. Other crystal types may also be used. A multi-refringent crystal is a crystal or assembly capable of downconverting to multiple photons (i.e., ≧2). Such a crystal can be based on a non-linear optic. Such an assembly can be based on a pair of bi-fringent crystals in series with a first bi-fringent crystal (4 beam pairs). The bi-refringent crystal 900 may produce a pair of entangled biphoton beams 800 and 801. The first entangled biphoton beam 800 can consist of two photon beams 505 and 506. The outer photon beam 505 can comprise of photons of a longer wavelength than the inner photon beam 506. The second entangled biphoton beam 801 can similarly consist of two photon beams 507 and 508, where the inner beam 507 can comprise photons of a shorter wavelength than the outer photon beam 508. In this example, the outer photon beams 505 and 508 of the two entangled bi-photon beams 800 and 801 are comprised of a first photon state defined by a wavelength of 766.5 nm and the inner photon beams 506 and 507 of the two entangled biphoton beams 800 and 801 are comprised of a second photon state defined by a wavelength of 647.9 nm. The two inner photon beams 506 and 507 are separated by a phasematching angle 5, 41 degrees in this example, which is determined by the refractive characteristics of the bi-refringent crystal 900. The first entangled biphoton beam 800 can be directed through a first mirror-mixer combination 951 and the second entangled biphoton beam 801 can be directed towards a second mirror-mixer combination 952. The two mirror-mixer combinations 951 and 952 may be strategically placed to establish the necessary angles relative to the bi-refringent crystal's centerline 008 to define two converged paths 635 and 636, one for each of the two entangled biphoton beams 800 and 801. In this example, the first mirror-mixer combination 951 can define the converged path 635 for the first entangled biphoton beam 800, and the second mirror-mixer combination 952 can define the converged path 636 for the second biphoton beam 801. The mirror-mixer combinations 951 and 952 can direct two converged entangled biphoton beams along their respective converged paths 635 and 636 towards a beam splitter 588. A tunable phase adjuster 747 can be placed in the converged path 635 between the first mirror-mixer combination 951 and the beam splitter 588. A fixed phase adjuster 748 can be placed in the converged path 636 between the second mirror-mixer combination 952 and the beam splitter 588. The location of the tunable phase adjuster 747 may be switched with the location of the fixed phase adjuster 748 without altering the operation of the interferometer. The converged entangled biphoton beams along converged paths 635 and 636 meet at a single interference point 001 on the beam splitter 588 and then re-emerge as two entangled biphoton output beams 989 and 990, with one being the entangled double of the other. Optical slits 911 can be placed in the path of each entangled biphoton output beam 989 and 990 to further define their energy and position.

Also shown in FIG. 1 is an external detection system which may be used with the interferometer to observe interference effects. A first cold filter 120 can be placed in the path of the entangled biphoton output beam 989 and a second cold filter 121 can be placed in the path of the entangled biphoton output beam 990. The entangled biphoton output beam 989 is partially reflected by the first cold filter 120, resulting in two component beams 125 and 126 directed towards a first detector 151 and a second detector 152 respectively. The entangled biphoton output beam 990 is partially reflected by the second cold filter 121, resulting in two component beams 127 and 128 directed towards a third detector 153 and a fourth detector 154 respectively. In this example cooled photomultiplier tubes are used as detectors, however other devices such as solid-state detectors may also be used. The detectors 151, 152, 153, and 154 can then be coupled to a signal processing system to display information (e.g. diagnostic information). The type of information obtained from the signal processing system may vary upon specific applications of the interferomter.

Figure 2:
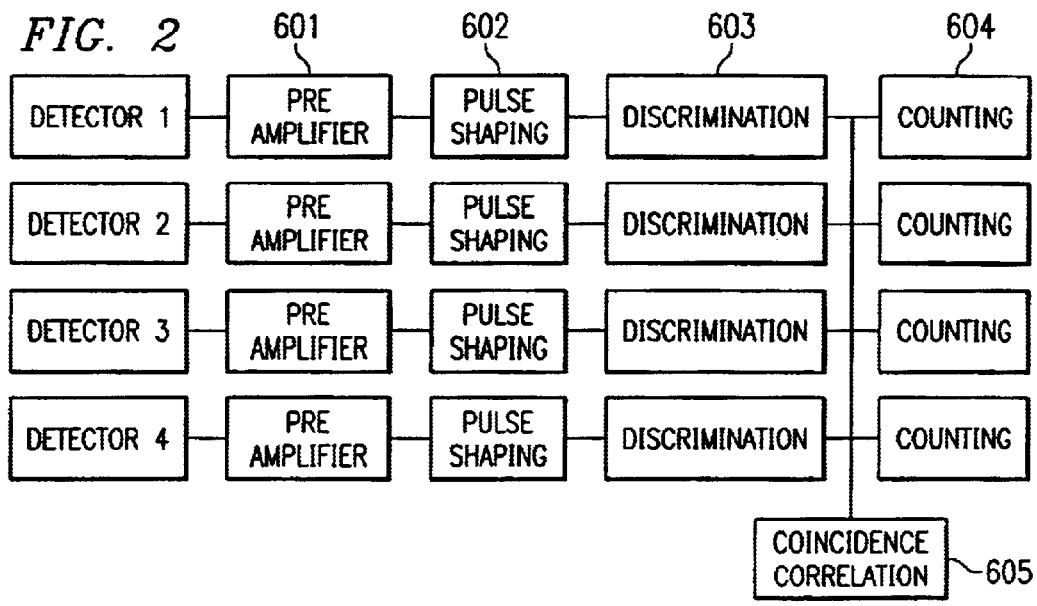
FIG. 2 illustrates a block schematic view of a detection system, representing an embodiment of the invention.

The signal processing system illustrated in FIG. 2 may be used with the interferometer. It can be used to output coincidence correlation data. Each of the four detectors can be coupled to the system as inputs. Each detector is coupled in series to a pre-amplifier 601, a pulse shaping unit 602, a pulse discrimination filter 603, and a counting device 604 via buses. A coincidence correlation calculator 605 is coupled to the outputs of all four pulse discrimination filters 603. The coincidence correlation calculator 605 may present coincidence rate information obtained from the interferomter via a graphical user interface.

Referring again to FIG. 1, the argon ion laser 503 can be used as a source of short-wavelength, coherent light in a two-color entangled photon source 500. The argon ion laser 503 can project a beam of coherent light 504 towards a bi-refringent crystal 900 via a focusing lens 700. The focusing lens 700 can more accurately direct the light rays within the beam of coherent light 504 towards a point of convergence within the bi-refringent crystal 900. The bi-refringent crystal 900 performs a downconversion function on the entering beam of coherent light 504. The beam of coherent light 504 can be transformed into N entangled biphoton beams (where N≧2), in this example a first entangled biphoton beam 800 and a second entangled biphoton beam 801, wherein the energy of the entering beam of coherent light 504 is equal in magnitude to the sum of the energies of the N emerging entangled biphoton beams, in this example the sum of the energies of entangled biphoton beams 800 and 801. Each entangled biphoton beam 800 and 801 can consist of two component photon beams 505, 506, 507, and 508 of distinct wavelengths. In this example, photon beams 505 and 507 have a wavelength of 766.5 nm and photon beams 506 and 508 have a wavelength of 647.9 nm. The photon beams 505 and 506 of the first entangled biphoton beam 800 can be redirected towards a single interference point 001 on a beam splitter 588 along a first common converged path 635 by a first mirror-mixer combination 951. The photon beams 507 and 508 of the second entangled biphoton beam 801 can be redirected towards the single interference point 001 on the beam splitter 588 along a second common converged path 636 by a second mirror-mixer combination 952. A tunable phase adjuster 747 placed on the first common converged path 635 can be tuned to achieve a condition that permits two entangled biphoton beams to be output simultaneously by the two-color entangled photon source 500. A fixed phase adjuster 748 placed on the second common converged path 636 can be used to set a reference phase according to which the tunable phase adjuster 747 is tuned. Entangled biphoton beams follow the converged paths 635 and 636 and intersect at the single interference point 001 on the beam splitter 588. At the beam splitter 588, all entangled biphoton beams on all paths converge, interfere, and then emerge as a first entangled biphoton output beam 989 and a second entangled biphoton output beam 990. Optical slits 911 can be placed in the paths of the biphoton output beams 989 and 990 to minimize effects of non-contributing biphotons at the output of the two-color entangled photon source 500.

Still referring to FIG. 1, the detector assembly can be used to monitor interference effects in the two-color entangled photon source 500. A first cold filter 120 can be optically coupled to the first entangled biphoton output beam 989. A second cold filter 121 can be optically coupled to the second entangled biphoton output beam 990. The cold filters 120 and 121 transmit shorter wavelengths and reflect longer wavelengths of the entangled biphoton output beams 989 and 990 they are coupled to. A first optical detector 151 can be used to monitor characteristics of the shorter wavelength photon beam 125 in the first entangled biphoton output beam 989 and a second optical detector 152 can be used to monitor characteristics of the longer wavelength photon beam 126 in the first entangled biphoton output beam 989. A third optical detector 153 can be used to monitor characteristics of the longer wavelength photon beam 127 in the second entangled biphoton output beam 990 and a fourth optical detector 154 can be used to monitor characteristics of the shorter wavelength photon beam 128 in the second entangled biphoton output beam 990. Referring again to FIG. 2, a signal processing unit may be used to monitor interference patterns produced by optical detectors coupled to a two-color entangled photon source. The input signals of the signal processing unit can be generated by the optical detectors (shown in FIG. 1). Each input signal is amplified by a pre-amplifier 601, shaped into a pulse by a pulse-shaping system 602, and then filtered by a pulse discrimination system 603. The pulse discrimination system 603 can remove any noise in the input pulses. A pulse counter 604 counts input pulses and transmits this information to a coincidence correlation calculator 605, which may calculate and present desired output information via a graphical user interface.

Beginning at the left in the diagram of FIG. 1, a source of short-wavelength, coherent light is focused on a bi-refringent crystal, which performs downconversion to two entangled photons that sum to the applied energy of the source. The two photons are referred to as biphoton, a termed coined by Klyshko [David H. Klyshko, *Photons and Nonlinear Optics,* Gordon and Breach, New York, 1988] and extensively promoted by Shih et al. [Y. H. Shih, D., V. Strekalov, T. D. Pittman, and M. H. Rubin, "Why Two-Photon but Not Two Photons?," *Fortschr. Phys.,* 46, 627–641, 1998] to express the essential unitary and quantum nature of the pair emitted in parametric down conversion. In the down-conversion process, a pump photon of energy $w_p$ forms a well-defined quantum state of overlapping electromagnetic fields in the presence of an acentric crystal lattice. The state thus formed has particular well-defined quantum numbers for polarization, energy, momentum, and position that are preserved upon decay into two photons (and occasionally three photons). The ensuing two-photon state, preserving the quantum numbers of the parent state, is necessarily entangled in that any measured property of one of the photons allows one to predict with certainty the corresponding property of the other. A conservation law is the fundamental principle behind such entanglement. Thus, if the pump photon of energy $w_p$ interacts with nonlinear fields in an acentric crystal, it can be re-emitted as two photons with energies $w_1$ and $w_2$ where $w_p=w_1+w_2$. This is simply a restatement of the law of conservation of energy. Similar considerations apply to the conservation of momentum.

The pump photon source used was an argon-ion laser operating at 351.1 nm. A focusing lens is placed between the laser and the downconversion crystal to produce minimum beam waist and to maximize the radius of the Gaussian beam at the crystal. The crystal used is a beta-barium borate (BBO) although other crystal types may be used depending on the desired wavelengths. The crystal downconverts the pump photon beam to a spectrum of energies emitted in a cone pattern whose angles are determined by several specified parameters including the phasematching angle of the crystal (cut by the manufacturer for Type I downconversion with 41 degree phasematching) and the angle of the pump beam.

The inventors chose to create 766.5 nm and 647.9 nm biphotons[1], which are emitted in concentric cones from the crystal. The plane of the interferometer (consisting of mirrors, mixers, and beamsplitter) cuts across these cones; biphotons traveling outside this plane are lost. The longer wavelength biphotons (766.5 nm) travel along the outside paths (A and D) while shorter wavelengths (647.9 nm) travel along the inside paths (B and C). Mirrors and mixers are placed to establish the necessary angles relative to the crystal's centerline to define paths unique to those wavelengths. The mirror-mixer combinations on each side of the apparatus converge the paths of their respective wavelengths (paths A and B and paths C and D) and send them to the beamsplitter for interference at a single point. Phase adjusters are placed in the converged paths to permit variation in the relative phase of the photons arriving at the beam splitter. The phase adjusters, one fixed and one variable, vary the optical path length. Phase adjustment is essential to achieving a condition that permits one wave function to exit on output beam A while its entangled double emerges simultaneously on beam B.

At the beamsplitter all paths converge, interfere then re-emerge in two beams. The two emergent beams consists of the converged transmitted and reflected photons from paths A–B and C–D. Optical slits are placed beyond the beamsplitter to further define the beam path in both energy and position. Slits are necessary to minimize the deleterious effects of non-contributing biphotons arriving at the detectors. Although those non-contributing biphotons are of correct wavelength, they emerge from the crystal at different locations (along the face of the crystal and along the pump beam path) and thus arrive at the detectors from slightly different angles and phases reducing interference visibility.

Previous work on color-entangled photons kept the two colors separate by using a beam splitter in each of the two paths rather than bringing all four paths together at a single point. Most significantly, by convergence of all four biphoton paths (A,B,C, and D) on a beam splitter, the inventors erase information on both momentum (the direction vector) and energy (the wavelength of each photon in the system). The erasure of momentum permits fourth-order interference, which manifests itself as changes in coincidence count rates as the path phase is varied. Fourth-order interference, without the erasure of energy (aka momentum) has been demonstrated by Rarity and Tapster [J. Rarity and P. Tapster, "Experimental Violation of Bell's Inequality Based on Phase and Momentum," *Phys. Rev. Lett.* 64, 2495 (1990)].

Both the merged-path configuration and the resulting nature of the emergent biphotons are unique to this invention. Photon pairs can be forced to branch with a 50—50 probability to the left (upper path after the beam splitter) or the right by a controllable adjustment of the phase of the upper path with respect to the lower path. A phase change of π from that branch point will cause the photon pair to split such that one half always travels to the left while the other half goes to the right. Table 1 shows the fours coincidence possibilities. By phase adjustment, coincidence counts in either pairs (1,2) and (3,4) or (1,3) and (2,4) can be emphasized.

TABLE 1

| Dectector | Output Beam | Wavelength | Coincidence pairs |     |     |
| --- | --- | --- | --- | --- | --- |
| 1 | A | 647.9 nm | (1,2) | (1,3) |     |
| 2 | A | 766.5 nm |     |     | (2,4) |
| 3 | B | 766.5 nm | (3,4) |     |     |
| 4 | B | 647.9 nm |     |     |     |

Alternative Embodiment

Most of the downconverted photons are lost when are operating with a planar segment of the crystal's output. Other optical configurations are possible to capture those otherwise lost photons and increase overall output.

Figure 7A:
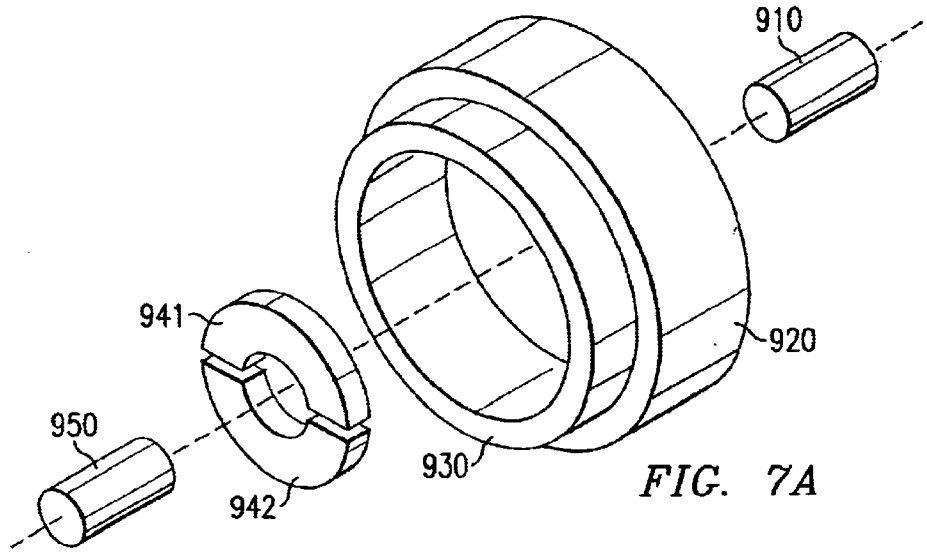
FIGS. 7A and 7B illustrate perspective and orthographic views of a high yield interferometer configuration, representing an embodiment of the invention.
Figure 7B:
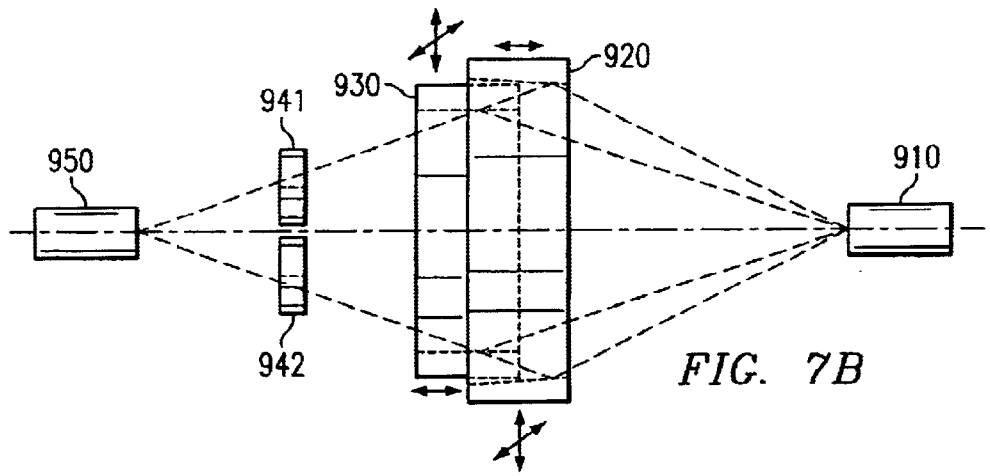

Referring to FIGS. 7A and 7B, it is important to note that all the schematically depicted cylindrical components could be radially subdivided into subsections (e.g., 2, 3, 4, etcertera.) to maintain spatial separation between discrete beams. Radial subdivision could be achieved by providing a plurality of subcomponents separated by gaps or by providing apertures and/or slits. The schematic cylindrical configuration shown in FIGS. 7A and 7B enables a higher yield of multiples from the downconversion and entanglement device compared to a planar configuration, thereby increasing overall output. This system can, therefore, be termed high yield or high efficiency.

A downconversion and entanglement device 910 is optically coupled to a ring mirror 920. The ring mirror 920 can be provided with an angled inner surface to facilitate merging an outer portion of the entangle multi-photon cone with an inner portion. The ring mirror 920 is optically coupled to a ring combiner 930. The ring combiner 930 is optically coupled to a first phase delay component 941 and a second phase delay component 942. The first phase delay component 941 and the second phase delay component 942 can provide two discrete beams. One of the phase delay components can be a fixed phase adjuster and the other can be an adjustable phase adjuster. It can be advantageous to minimize the gaps between the first phase delay component 941 and the second phase delay component 942, thereby increasing yield. The first phase delay component 941 and the second phase delay component 942 are optically coupled to a beam splitter 950.

The ring mirror 920 can be repositionable along X, Y and Z axes. Similarly, the ring combiner 930 can be repositionable along X, Y and Z axes. The system can also include energy-position defining apertures and/or slits (not shown in FIGS. 7A and 7B).

As in the previous configurations, the downconversion and entanglement device 910 is pumped by a wavefunction generator (not shown in FIGS. 7A and 7B). The outer portion of the entangled multi-photon cone is then reflected by mirror ring 920 and merged with the inner portion of the entangled biphoton cone by ring combiner 930. A relative phase delay is introduced between two discrete beams by components 941 and 942. Recombination of the out-of-phase discrete beams can take place at the beam splitter 950.

Detector

The detection system, although not a part of the interferometer, is desirable to observe the interference effects. The detector system is shown just beyond the beam splitter and slits shown in FIG. 1. Cold filters[2] separate the output beams into their two component wavelengths and direct them to one of four detectors. Other beam separating devices, such as cold mirrors may also be used. The inventors use cooled photomultiplier tubes in our apparatus; however, solid-state detectors will also work. Signal processing for the photon detection apparatus is shown in FIG. 2. Four channels comprise the counting system. The system has the capability of counting coincidence events between detector outputs as shown in Table 1 and counting and integrating events in each channel.

Laboratory Results

Figure 3A:
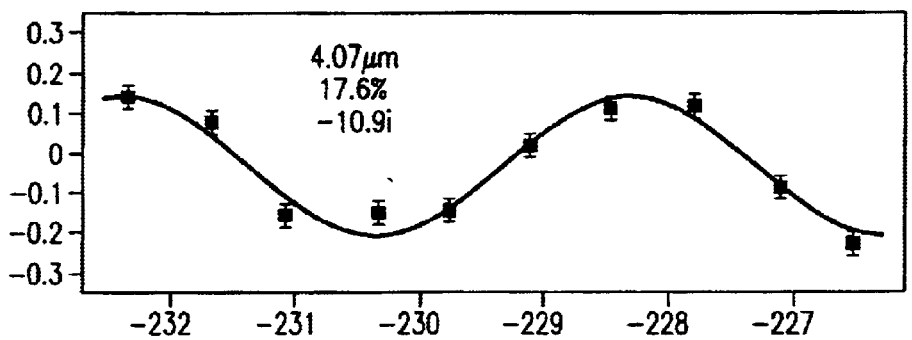
Figure 3B:
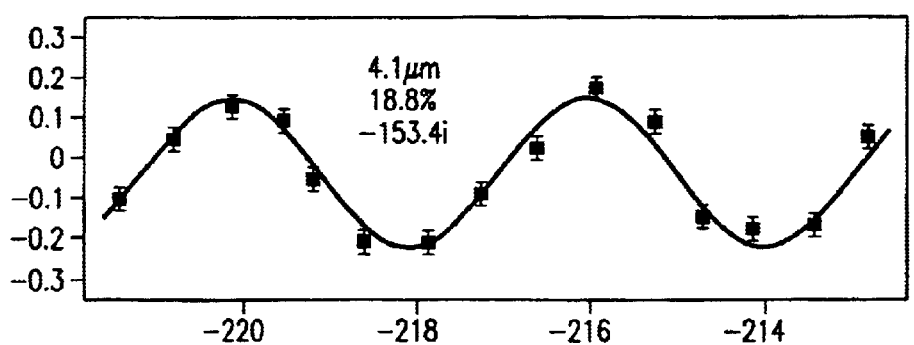

Experimental proof that the interferometer functions as described is illustrated in FIGS. 3A–3C. These traces were obtained by changing the optical path in the right leg of the interferometer before the beam splitter, and then varying the optical path in the left leg, also before the beam splitter. This protocol has the advantage of also simulating the concept of the microscope that has one side (right leg) adjusted for a particular range of variations, and then these variations are mapped out by moving the sample in the beam on the other side (left leg).

Referring to FIGS. 3A–3C, examples of fourth-order interference patterns are depicted. In each of FIGS. 3A–3C, the ordinate in wavelength of the difference energies between the 766 nm photon and the 647 nm photon is measured in microns, that is:

$$\left(\frac{1}{.6473} - \frac{1}{.7665}\right) \approx \frac{1}{4.16}$$

The solid sinusoidal curves depicted in FIGS. 3A–3C are interpolations of the experimental data. The amplitude of the patterns is 17.6%, 18.8% and 19.8%, respectively. This aspect of the experimental results may be improved if the non-planar nature of the front wave arriving at the sensor array is taken into consideration (geometrical spreading), making the peak value of the normalized amplitude of the interference patterns be 1, i.e. 100%. In specific arrangements, other losses may be taken into account for this purpose as well. Upon reaching the multi-refringent device, the incident photon beam refracts and emerges from the multi-refringent device as N quasi-beams of photons, where N is a function of the number of refringent indices set-up by the multi-refringent device. Each of the quasi-beams can define a hollow cone, where the wall thickness of the hollow cone represents a spectrum of energy associated with that quasi-beam. The N quasi-beams can be substantially coaxial. The relative divergence of the N quasi-beams can be spatially tuned by changing the relative angle(s) between the incident photon beam and the multi-refringent device and/or cutting the multi-refringent device.

Microscope

The invention can include placing a specimen in one of the beam paths. FIG. 4 shows such an arrangement. The specimen may be placed in beam paths other than the ones shown in the figure, which happens to be a path of combined wavelength.

The invention can include an instrument that permits profile measurements over a very wide dimensional range (nano-meters to micrometers). Sharp edges and jumps do not cause a problem, as is the case with fringe-counting instruments.

Feature depth has been successfully measured with optical interference apparatus; however, a particular problem often arises that limits the range of measurement. The wavelength often used is short (e.g., visible or near-IR light may be used so as to be reflected from the surface); therefore, fringes must be counted when large depth changes are encountered. Fringe counting poses a problem when large jumps are experienced.

A wide-range (from micrometers to nano-meters) distance measuring instrument is created using a special interferometric source of entangled two-color photons and an array of photon detectors. The feature depth of a specimen can be measured by placing it in an interior beam path of a specially constructed interferometer. This interferometer has been described in a previous report of subject invention (ID 0866). The optics of the interferometer can be arranged to use either the surface reflections from the specimen or transmission through the specimen material. The interferometer utilizes fourth-order interference of entangled photons to measure phase differences. Fourth-order interference effects are measured by counting coincidence events in contrast with second-order interferences, which are revealed as changes in beam intensity. For the case of a reflective specimen, feature surface depth variations cause minute temporal phase differences in the optical signal pathway, which also modify the interference position.

The wavelength of the interference is only indirectly related to the wavelength used to probe the specimen and the wavelengths can be adjusted. Thus, either or both of two different wavelengths can be selected to probe and scan the specimen (obviously chosen to be compatible with it) while a fourth-order interference occurs at the difference wavelength. This wavelength dissimilarity is useful for applications in which there may be compatibility problems with longer wavelength light. There are applications where this will have unique advantages over existing interferometric measurement methods. Although visible and near IR wavelengths were used in the initial studies, there is no theoretical upper or lower limit to the probe wavelength selection. It may also be possible to apply this invention to particles as well.

The quantum interferometer that supports the microscope can generate a two-color, two-output beam of energy and momentum entangled photons. Detectors are placed in the exit path of these beams to count coincidence events. The coincidence counts between the detectors are summed using a formula. These summed counts indicate phase position and hence depth of a feature on the specimen.

A specimen may be scanned by moving it with an x-y translation stage. The precision of motion can range from micrometers to nano-meters depending on the type of stage employed. A coarse and fine motion stage can be stacked to achieve a wide range of motion with fine resolution. With x-y motion control and position indication from the translation stage and wide-range depth measurement from the special interferometer, a three dimensional view of the surface can be constructed.

Insertion of specimen interior to the interferometer thus feature height on the specimen alters the relative path phase. Coincidence counts can be used to measure phase difference. The precision of measurement is determined by counting statistics.

The invention can be used to measure spatial displacements ranging from nano- to micro-meters. Decoupling of the probe wavelength and the interference wavelength opens up new measurement possibilities.

A wide-range distance-measuring instrument can be created using the interferometric source of entangled two-color photons and an array of photon detectors. The range of measurement can be from nano- to micro-meters and beyond using the same apparatus. The feature depth of a specimen can be measured by placing it in an interior beam path of a specially constructed interferometer.

The optics of the interferometer can be arranged to use either surface reflections from the specimen or transmission through the specimen material. The interferometer utilizes fourth-order interference of entangled photons to measure phase differences. Fourth-order interference effects are measured by counting coincidence events in contrast with second-order interference, which are revealed as changes in beam intensity. For a reflective specimen, variations in feature surface depth cause minute temporal phase differences in the optical signal pathway, which modify the interference position.

The interference wavelength is only indirectly related to the probe wavelength and it can be adjusted. Thus, two wavelengths can be selected to probe and scan the specimen (obviously chosen to be compatible with it) while fourth-order interference occurs at the difference wavelength. This wavelength dissimilarity is useful for applications in which thee may be compatibility problems with longer wavelength light.

Referring to FIG. 4, a two-color entangled interferometer with specimen stage is depicted. A downconverting crystal 310 is optically coupled to a pair of mirrors 320, 325 and to a pair of mixers 330, 335. The mixer 330 is optically coupled to a tunable phase adjuster 340, while the mixer 335 is optically coupled to a fixed phase adjuster 350. The tunable phase adjuster 340 is optically coupled to the specimen stage. The specimen stage includes a beam probe director and specimen assembly 360. The beam probe director and specimen assembly 360 and the fixed phase adjuster 350 are optically coupled to a beam splitter 370. The beam splitter 370 is optically coupled to energy-position defining slits 380, 385, which are coupled to detector beam arrays 1&2 and 3&4 390, 395, respectively.

The operation of the system shown in FIG. 4 will now be described. A light beam 300 reaches a downconverting crystal 310 (a beta-barium borate crystal is shown although other crystal types may be used depending on the desired wavelengths), which emits a spectrum of energies in concentric cone patterns. The beams following paths A and D reflect from mirrors 320, 325, and reach mixers 330, 335, respectively. The beams following paths B and C reach mixers 330, 335 directly. The resulting beam leaving the mixer 330 reaches a tunable phase adjuster 340, while the resulting beam leaving the mixer 335 reaches a fixed phase adjuster 350. Phase adjusters 340, 350 are placed in the converged paths to permit variation in the relative phase of the photons, allowing a wavefunction to emerge simultaneously with its entangled double.

Still referring to FIG. 4, the output beam from the tunable phase adjuster 340 reaches the beam probe director and specimen assembly 360, and then a beam splitter 370. The output beam from the fixed phase adjuster 350 also reaches the beam splitter 370, where all paths converge, interfere, and then re-emerge in two beams. The two emerging beams 371, 372 from the beam splitter 370 are transmitted through energy-position defining slits 380, 385, and reach detector arrays 1&2 and 3&4 390, 395, respectively.

Referring to FIG. 5, a detailed diagram of a probe beam director and specimen assembly is depicted. A mirror 410 is optically coupled to a beam splitter 420. The beam splitter 420 is optically coupled to the specimen 430 and a mirror 440. The mirror 440 is optically coupled to another mirror 450. Depending upon the overall geometry and path length dimensions, mirrors may be added or eliminated from this arrangement.

The operation of the systems shown in FIG. 5 will now be described. A probe beam director receives an incident beam 400 which reflects from the mirror 410, and is transmitted through the beam splitter 420. A transmitted beam 435 reflects from the surface of the specimen 430, and returns to the beam splitter 420. Upon reflection from the beam splitter 420, a reflected beam 349 is steered by use of a pair of mirrors 440, 450. The result is the output beam 460.

Figure 6A:
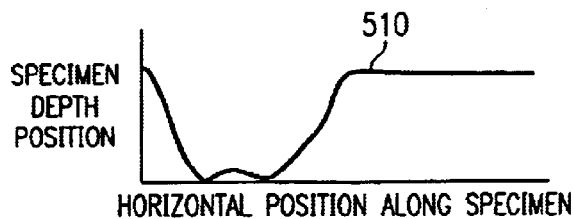
FIG. 6 illustrates specimen depth position and coincidence count rate, both as a function of horizontal position along a specimen, representing an embodiment of the invention.
Figure 6B:
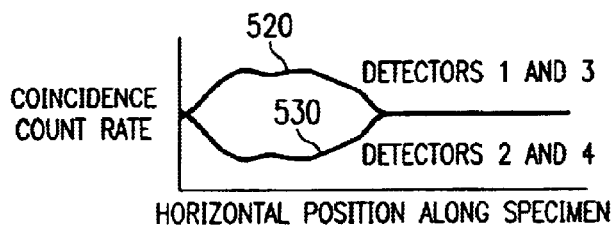

Referring to FIG. 6-A, a specimen's depth position is depicted as function of the horizontal position along a specimen. Function 510 shows the specimen's depth profile (surface variation) along an arbitrary lateral scan. In this illustration, a large trough with a relatively small peak in the middle is present before the function 510 reaches a flat region. Referring to FIG. 6-B, the coincidence count rate is depicted as function of the horizontal position along the specimen, as detected by the detector arrays 1&3 and 2&4. Functions 520 and 530 illustrate how the coincidence count rate (detected by arrays 1&3 and 2&4, respectively) varies along the horizontal position as function of phase change, which is caused by change in the specimen's depth position. In this illustration, a large trough with a relatively small peak in the middle is present before the function 510 reaches a flat region. Also, a large peak with a relatively small trough is present before the function 520 reaches a flat region.

A specimen is placed in one leg of the interferometer as shown in FIG. 4. The combined photons from paths A and B (prior to the beam splitter) are reflected from the surface of the specimen as shown in FIG. 4.

FIG. 5 shows a detail of the components for redirecting photons out of the beam path to the specimen and back. (Note that the path length adjuster in the leg with the specimen may be eliminated depending on the overall geometry and path length dimensions.)

By placing the specimen in the light path using this configuration, variations in specimen surface height result in changes in (timing) phase of the light traveling along the path. This has the same effect as adjusting the phase adjuster, which is to force the fourth-order interference pattern to a different position. The result is a change in coincidence count rate. Thus, the relative vertical position of the specimen surface is measured with respect to a reference point.

The specimen may be scanned by an x-y translation stage. The precision of motion can range from micrometers to nano-meters depending on the type of stage employed. A coarse and fine motion stage can be stacked to achieve a wide range of motion with fine resolution With x-y motion control and position indication from the translation stage and a wide-range depth measurement from the special interferometer, a three dimensional view of the surface can be constructed.

An example of the interferometer's measurement capability is illustrated by showing count rate as a function of source variation as shown in FIG. 6. Coincidence count rate varies as a function of path phase change, which is caused by change in specimen depth position. The top portion of FIG. 6 depicts a variation in specimen surface displacement with horizontal position. The bottom portion shows the proportional effect on coincidence count rates in detectors of complementary energies. The example shown is for the case of nearly equal path lengths. Thus, the complementary photon pairs are split between output beams A and B (i.e. coincidences are counted in detector pairs 1 and 3, and 2 and 4). By selection of beam splitter position or path length adjustment, photon pairs can be made to travel down the output beams toward the meeting point in the combiner so as to meet at one time and not be not split. In that case, the coincidences will be seen in detector pairs 1 and 2, and 3 and 4.

For this interferometer, the difference between the wavelength of the two selected crystal output wavelengths determines the interference wavelength, which produces the fringe cycle. The cycles can be made arbitrarily long by closely spacing the wavelengths; therefore, wide ranges of displacement measurements can be made without skipping to the next cycle and thus having to count fringes as with other interferometric displacement measurement schemes.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

While not being limited to any performance indicator or diagnostic identifier, preferred embodiments of the invention can be identified one at a time by testing for the presence of points of coincidence in entangled photon beams output by the invention. The test for the points of coincidence can be carried out without undue experimentation by a simple and conventional coincidence count measurement experiment. Preferred embodiments of the invention can also be identified one at a time by testing for the presence of accurate and precise results. The test for the presence of accurate results can be carried out without undue experimentation by use of a simple and conventional standard calibration. The test for the presence of precise results can be carried by statistical analysis of a population of measurements.

Practical Applications of the Invention

A practical application of the invention that has value within the technological arts is providing a useful source of entangled photons. Such a source can be used in optical measurement devices. For instance an optical microscope that can measure spatial displacements on a sample of interest. The range of measured spatial displacements can be from nano-meters to micro-meters due to the nature of the source. Further, the invention is useful in mapping of the surface of semiconductors, MEMS (micro electro mechanical systems), biological materials, mapping thickness for transparent materials, and the like. There are virtually innumerable uses for the invention, all of which need not be detailed here.

Advantages of the Invention

A source of multi-color entangled photons, representing an embodiment of the invention, can be cost effective and advantageous for at least the following reasons. The single beam splitter which accommodates the interference point allows the erasure of two degrees of uncertainty, thereby allowing point measurement. The invention permits a precise meeting of the beams at the interference point, thereby reducing the fringe cycle. Reducing the fringe cycle can improve accuracy. The invention improves quality and/or reduces costs compared to previous approaches.

An optical microscope using an interferometric source of two-color, two-beam entangled photons, representing an embodiment of the invention, can be cost effective and advantageous for at least the following reasons. The invention permits a precise meeting of the beams at the interference point, thereby reducing the fringe cycle which can improve accuracy. The invention can take broader measurements since longer wavelengths can be used. The invention improves quality and/or reduces costs compared to previous approaches.

All the disclosed embodiments of the invention disclosed herein can be made and used without undue experimentation in light of the disclosure. Although the best mode of carrying out the invention contemplated by the inventors is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials. Further, variation may be made in the steps or in the sequence of steps composing methods described herein.

Further, although the source of multi-color entangled photons described herein can be a separate module, it will be manifest that the source of multi-color entangled photons may be integrated into the system with which it is associated. Similarly, although the optical microscope using an interferometric source of two-color, two-beam entangled photons described herein can be a separate module, it will be manifest that the optical microscope using an interferometric source of two-color, two-beam entangled photons may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

References

Boto et al., "Quantum interferometric optical lithography: exploiting entanglement to beat the diffraction limit," *Phys. Rev. Lett.*, 85:2733, 2000.

Bouwmeester et al., "Experimental quantum teleportation," *Nature*, 390:575, 1997.

Klyshko, In: *Photons and nonlinear optics*, Gordon and Breach, New York, 1988.

Rarity and Tapster, "Experimental violation of Bell's inequality based on phase and momentum," *Phys. Rev. Lett.*, 64:2495, 1990.

Rarity and Tapster, "Two-color photons and nonlocality in fourth-order interference," *Phys. Rev.* A41:5139, 1990.

Rarity et al., "Two photon interference in a Mach-Zehnder interferometer," *Phys. Rev. Lett.*, 65:1348, 1990.

Shih, Strekalov, Pittman, Rubin, "Why two-photon but not two photons?," *Fortschr. Phys.*, 46:627–641, 1988.

Handbook of Optics, Volumes I–II, 2nd ed., (Michael Bass et al. eds.), McGraw Hill Inc., 1995.

Fundamentals of Photonics, (Saleh and Teich), John Wiley & Sons, Inc., 1991.

What is claimed is:

1. A method, comprising:
   downconverting a beam of coherent energy to provide a beam of multi-color entangled photons;
   converging two spatially resolved portions of the beam of multi-color entangled photons into a converged multi-color entangled photon beam;
   transforming at least a portion of the converged multi-color entangled photon beam by interaction with a sample to generate an entangle photon specimen beam; and
   combining the entangled photon specimen beam with an entangled photon reference beam within a single beam-splitter.

2. The method of claim 1, wherein the entangled photon specimen beam and the reference beam are combined within a single interference zone within the single beam splitter.

3. The method of claim 1, further comprising adjusting a reference beam phase of the entangled photon reference beam before combining.

4. The method of claim 1, further comprising adjusting a specimen beam phase of the entangled photon specimen beam before combining.

5. The method of claim 4, wherein adjusting the specimen beam phase includes retarding the specimen beam phase with a tunable phase adjuster.

6. The method of claim 1, wherein transforming includes:
   diverting the specimen beam to a beam splitter; and
   reflecting at least a portion of the specimen beam from the specimen.

7. The method of claim 6, wherein transforming includes redirecting the specimen beam back to an original path.

8. The method of claim 1, further comprising characterizing the sample by detecting a fringe cycle.

9. A computer program, comprising computer or machine readable program elements translatable for implementing the method of claim 1.

10. An electronic medium, comprising a program for performing the method of claim 1.

11. An apparatus, comprising:
    a multi-refringent device providing a beam of multi-color entangled photons;
    a condenser device optically coupled to the multi-refringent device, the condenser device converging two spatially resolved portions of the beam of multi-color entangled photons into a converged multi-color entangled photon beam;
    a beam probe director and specimen assembly optically coupled to the condenser device; and
    a beam splitter optically coupled to the beam probe director and specimen assembly, the beam splitter combining an entangled photon specimen beam from the beam probe director and specimen assembly with an entangled photon reference beam.

12. The apparatus of claim 11, wherein the multi-refringent crystal includes a non-linear crystal.

13. The apparatus of claim 12, wherein the non-linear crystal includes a bi-refringent crystal.

14. The apparatus of claim 12, wherein the non-linear optical crystal includes at least one member selected from the group consisting of $LiB_3O_5$, $KH_2PO_4$, $KD_2PO_4$, $NH_4H_2PO_4$, $\beta$-$BaB_2O_4$, $LiIO_3$, $KTiOPO_4$, $LiNbO_3$, $KnbO_3$, $AgGaS_2$, $ZnGeP_2$, $KB_5O_8$—$4H_2O$, $CO(NH_2)_2$, $CsH_2AsO_4$, $CsD_2AsO_4$, $KTiOAsO_4$, MgO: $LiNbO_3$, $Ag_3AsS_3$, GaSe, $AgGaSe_2$, CdSe, $CdGeAs_2$, $KB_5O_8$—$4D_2O$, $CsB_3O_5$, $BeSO_4$—$4D_2O$, $MgBaF_4$, $NH_4D_2PO_4$, $RbH_2PO_4$, $RbD_2PO_4$, $KH_2AsO_4$, $NH_4H_2AsO_4$, $NH_4D_2AsO_4$, $RbH_2AsO_4$, $RbD_2AsO_4$, $LiCOOH$—$H_2O$, NaCOOH, $Ba(COOH)_2$, $Sr(COOH)_2$, $Sr(COOH)_2.2H_2O$, $LiGaO_2$, $\alpha$-$HIO_3$, $K_2La(NO_3)_5 \cdot 2H_2O$, $CsTiOAsO_4$, $NaNO_2$, $Ba_2NaNb_5O_{15}$, $K_2Ce(NO_3)_5 \cdot 2H_2O$, $K_3Li_2Nb_5O_{15}$, $HgGa_2S_4$, HgS, $Ag_3SbS_3$, Se, $Tl_3AsS_3$, Te, $C_{12}H_{22}O_{11}$, L-Arginine Phosphate Monohydrate, Deuterated L-Arginine Phosphate Monohydrate, L-Pyrrolidone-2-Carboxylic Acid, $CaC_4H_4O_6.4H_2O$, $(NH_4)_2C_2O_4.H_2O$, m-Bis(amonimethyl) benzene, 3-Methoxy-4hydroxy-benzaldehyde, 2-Furyl Methacrylic Anhydride, 3-Methyl-4-nitropyridine-1-oxide, Thienylchalcone, 5-Nitrouracil, 2-(N-Prolinol-5-nitropyridine), 2-Cyclooctylamino-5-nitropyridine, L-N-(5-Nitro-2-pyridyl) leucinol, $C_6H_4(NO_2)_2$ (m-Dinitrobenzene), 4-(N,N-Dimethylamino)-3-acetaminonitrobenzene, Methyl-(2,4-dinitrophenyl)-aminopropanoate, m-Nitroaniline, N-(4-Nitrophenyl-N-methylaminoacetonitrile, N-(4-Nitrophenyl)-L-prolinol, 3-Methyl-4-methoxy-4-nitrostilbene, and $\alpha$-$SiO_2$.

15. The apparatus of claim 11, further comprising a laser optically coupled to the multi-refringent device.

16. The apparatus of claim 15, further comprising a focusing lens optically coupled between the laser and the multi-refringent device.

17. The apparatus of claim 11, further comprising a first energy-position defining slit optically coupled to the beam splitter, and a second energy-position defining slit optically coupled to the beam splitter.

18. The apparatus of claim 17, further comprising a first detector array optically coupled to the first energy-position defining slit, and a second detector array optically coupled to the second energy-position defining slit.

19. An optical microscope, comprising the apparatus of claim 11.

* * * * *

UNITED STATES PATENT AND TRADEMARK OFFICE
CERTIFICATE OF CORRECTION

PATENT NO. : 6,762,844 B2
DATED : July 13, 2004
INVENTOR(S) : William B. Dress, Roger A. Kisner and Roger K. Richards It is certified that error appears in the above-identified patent and that said Letters Patent is hereby corrected as shown below:

Column 19,
Line 45, replace "entangle" with -- entangled --.

Column 20,
Line 35, replace "Sr(COOH)$_2$.2H$_2$O" with -- Sr(COOH)$_2$ · 2H$_2$O --.
Line 36, replace "K$_2$La(NO$_3$)$_5$. 2H$_2$O" with -- K$_2$La(NO$_3$)$_5$ · 2H$_2$O --.
Line 37, replace "K$_2$Ce(NO$_3$)$_5$. 2H$_2$O" with -- K$_2$Ce(NO$_3$)$_5$ · 2H$_2$O --.
Line 41, replace "CaC$_4$H$_4$O$_6$.4H$_2$O, (NH$_4$)$_2$C$_2$O$_4$.H$_2$O" with -- CaC$_4$H$_4$O$_6$ · 4H$_2$O, (NH$_4$)$_2$C$_2$O$_4$ · H$_2$O --.

Signed and Sealed this

Twenty-third Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,762,844 B2 Page 1 of 2
APPLICATION NO. : 09/938843
DATED : July 13, 2004
INVENTOR(S) : William B. Dress, Roger A. Kisner and Roger K. Richards It is certified that error appears in the above-identified patent and that said Letters Patent is hereby corrected as shown below:

In column 4, line 8, replace "$\{\chi_1, \chi_2, \chi_3\}$" with -- $\{\chi^1, \chi^2, \chi^3\}$ --.

In column 4, line 12, replace "$\{\phi_1 \chi_1\}$" with -- $\{\varphi_1 \chi^1\}$ --.

In column 4, lines 15-18, replace

"$\omega = \alpha_{1,1}\phi_1\chi_1 + \alpha_{2,1}\phi_2\chi_1 + \alpha_{3,1}\phi_3\chi_1 + \alpha_{1,2}\phi_1\chi_2 + \alpha_{2,2}\phi_2\omega_2 + \alpha_{3,2}\phi_3\chi_3 + \alpha_{2,3}\phi_2\chi_3 + \alpha_{3,3}\phi_3\chi_3,$ (1)" with -- $\omega = \alpha_{1,1}\varphi_1\chi^1 + \alpha_{2,1}\varphi_2\chi^1 + \alpha_{3,1}\varphi_3\chi^1 + \alpha_{1,2}\varphi_1\chi^2 + \alpha_{2,2}\varphi_2\chi^2 + \alpha_{3,2}\varphi_3\chi^2 + \alpha_{1,3}\varphi_1\chi^3 + \alpha_{2,3}\varphi_2\chi^3 + \alpha_{3,3}\varphi_3\chi^3,$ (1) --.

In column 4, lines 20-22, replace

"$\omega = (\alpha_{1,1}\phi_1 + \alpha_{2,1}\phi_2 + \alpha_{3,1}\phi_3)\chi_1 + (\alpha_{1,2}\phi_1 + \alpha_{2,2}\phi_2 + \alpha_{3,2}\phi_3)\chi_2 + (\alpha_{1,3}\phi_1 + \alpha_{2,3}\phi_2 + \alpha_{3,3}\phi_3)\chi_3.$ (2)"

with

-- $\omega = (\alpha_{1,1}\varphi_1 + \alpha_{2,1}\varphi_2 + \alpha_{3,1}\varphi_3)\chi^1 + (\alpha_{1,2}\varphi_1 + \alpha_{2,2}\varphi_2 + \alpha_{3,2}\varphi_3)\chi^2 + (\alpha_{1,3}\varphi_1 + \alpha_{2,3}\varphi_2 + \alpha_{3,3}\varphi_3)\chi^3$ (2) --.

In column 4, line 24, replace "$\omega = \zeta_1\chi_1 + \zeta_2\chi_2 + \zeta_3\chi_3$" with -- $\omega = \zeta_1\chi^1 + \zeta_2\chi^2 + \zeta_3\chi^3.$ --.

UNITED STATES PATENT AND TRADEMARK OFFICE
CERTIFICATE OF CORRECTION

PATENT NO. : 6,762,844 B2  Page 2 of 2
APPLICATION NO. : 09/938843
DATED : July 13, 2004
INVENTOR(S) : William B. Dress, Roger A. Kisner and Roger K. Richards It is certified that error appears in the above-identified patent and that said Letters Patent is hereby corrected as shown below:

In column 4, line 32, replace "$\omega = \zeta(\chi_1 + \chi_2 + \chi_3)$" with

-- $\omega = \zeta(\chi_1 + \chi_2 + \chi_3)$ --.

In column 4, line 34, replace "$\chi_1 + \chi_2 + \chi_3$" with -- $\chi_1 + \chi_2 + \chi_3$ --.

In column 4, line 50, replace "$\omega = \alpha\phi_1\chi_2 + b\phi_2\chi_1$" with -- $\omega = \alpha\varphi_1\chi_2 + b\varphi_2\chi_1$ --.

Signed and Sealed this

Seventeenth Day of October, 2006

JON W. DUDAS
*Director of the United States Patent and Trademark Office*